(12) United States Patent
Ek

(10) Patent No.: US 9,063,359 B2
(45) Date of Patent: Jun. 23, 2015

(54) ELECTRONIC DISPLAY PROJECTION ASSEMBLY HAVING SUBSTANTIALLY WHITE OFF STATE

(75) Inventor: Martin Ek, Dalby (SE)

(73) Assignees: Sony Mobile Communications AB, Lund (SE); Sony Corporation, Tokyo (JP)

(*) Notice: Subject to any disclaimer, the term of this patent is extended or adjusted under 35 U.S.C. 154(b) by 213 days.

(21) Appl. No.: 13/695,203

(22) PCT Filed: Feb. 28, 2012

(86) PCT No.: PCT/IB2012/050936
§ 371 (c)(1),
(2), (4) Date: Jan. 8, 2013

(87) PCT Pub. No.: WO2013/114162
PCT Pub. Date: Aug. 8, 2013

(65) Prior Publication Data
US 2013/0258213 A1    Oct. 3, 2013

Related U.S. Application Data

(60) Provisional application No. 61/592,310, filed on Jan. 30, 2012.

(51) Int. Cl.
*G02F 1/1335* (2006.01)
*G09G 3/36* (2006.01)
*G06F 3/041* (2006.01)
*G06F 3/042* (2006.01)
*G06F 3/045* (2006.01)
*G02F 1/13* (2006.01)
*G02F 1/1333* (2006.01)

(52) U.S. Cl.
CPC ........ *G02F 1/1313* (2013.01); *G02F 1/133504* (2013.01); *G02F 1/133526* (2013.01); *G02F 2001/133331* (2013.01); *G02F 2001/133562* (2013.01); *G02F 2203/66* (2013.01)

(58) Field of Classification Search
USPC .................................... 349/12; 345/104, 173
See application file for complete search history.

(56) References Cited

U.S. PATENT DOCUMENTS

| 6,211,932 | B1 | 4/2001 | Iigahama et al. | |
| 6,822,707 | B2* | 11/2004 | Ariyoshi et al. | 349/112 |
| 8,144,271 | B2* | 3/2012 | Han | 349/12 |
| 2001/0015780 | A1 | 8/2001 | Yamaguchi | |
| 2003/0072080 | A1* | 4/2003 | Ariyoshi et al. | 359/487 |
| 2011/0001712 | A1* | 1/2011 | Saito | 345/173 |
| 2011/0246877 | A1* | 10/2011 | Kwak et al. | 715/702 |

FOREIGN PATENT DOCUMENTS

| EP | 1302787 A2 | 4/2003 |
| EP | 2395496 A1 | 12/2011 |
| JP | 57000610 A | 1/1982 |

OTHER PUBLICATIONS

International Search Report mailed Sep. 27, 2012 in re PCT Application No. PCT/IB2012/050936 filed Feb. 28, 2012.

* cited by examiner

*Primary Examiner* — Hoan C Nguyen
(74) *Attorney, Agent, or Firm* — Coats & Bennett, P.L.L.C.

(57) ABSTRACT

One or more embodiments of a method and apparatus taught herein provide an electronic display projection assembly that comprises an electronic display configured to display an image, and a transparent glass layer positioned on one side of the electronic display on which the image is displayed. A projection layer is located on a surface of the glass layer. A projecting layer is positioned between the electronic display and the glass layer, and comprises a plurality of microlenses for projecting the displayed image onto the projection layer. The projecting and projection layers may be located on either opposing sides of the transparent glass layer, or on the same side beneath the glass layer. A corresponding method of providing an image from an electronic display is also disclosed.

16 Claims, 5 Drawing Sheets

ELECTRONIC DISPLAY PROJECTION ASSEMBLY HAVING SUBSTANTIALLY WHITE OFF STATE

BACKGROUND

The present invention generally relates to electronic displays, and more particularly relates to an electronic display projection assembly having a substantially white off state.

Most existing electronic display technologies used in handheld devices exhibit a black off state, such that when these electronic displays are turned off they maintain a black appearance. This includes, for example, liquid crystal displays (LCDs), which are used in many electronic devices, such as smartphones, laptops, televisions, media players, computer monitors, and many other devices. The black off state has forced industrial designers to accommodate the color black into their products, and as a result a very large number of products with a black impression occupy the market.

Another property exhibited by such displays is that a displayed image is generated at some depth below the surface of the device, with that image being viewed through a transparent glass surface. This can provide unwanted effects, such as a diminished immersive impression for users, and for touch screen devices can cause a parallax effect causing errors between the actual touch of finger and an intended touch area.

Yet another issue with these prior art displays is that they require the presence of a border around a display area, because they are unable to extend the displayed image to the far outer periphery of their screens. So, for example, if a prior art smartphone has a glass display surface, the displayed image cannot fully extend to the outer boundary of that display surface, and must be surrounded by a border covering the non-display portions of the display surface.

SUMMARY

An electronic display projection assembly comprises an electronic display configured to display an image, and a transparent glass layer positioned on one side of the electronic display on which the image is displayed. A projection layer is located on a surface of the transparent glass layer. A projecting layer is positioned between the electronic display and the glass layer, and comprises a plurality of microlenses for projecting the displayed image onto the projection layer. The projecting and projection layers may be located on opposing sides of the transparent glass layer, or on the same side beneath the glass layer.

A corresponding method of providing an image from an electronic display is also disclosed. According to the method, an image from an electronic display is displayed onto a projecting layer comprising a plurality of microlenses. The displayed image is projected through the plurality of microlenses and onto a projection layer on the transparent glass layer. The projecting and projection layers may be located on either opposite sides of the transparent glass layer, or on the same side beneath the glass layer.

The projection layer may be translucent, may be treated to reflect substantially white light when the electronic display is in an OFF state, and may have an applied anti-reflective coating.

The electronic display may be a liquid crystal display (LCD), and may include a collimated backlight. The transparent glass layer may comprise a touch screen input device.

The projecting layer may be configured to stretch the projected image to the outer edges of the glass panel, and may be constructed of multiple plastic layers arranged to form the microlenses.

In one or more embodiments, the electronic display has a plurality of pixels, with each pixel including at least three sub-pixels, and with an area of each microlens being smaller than an area of each sub-pixel.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
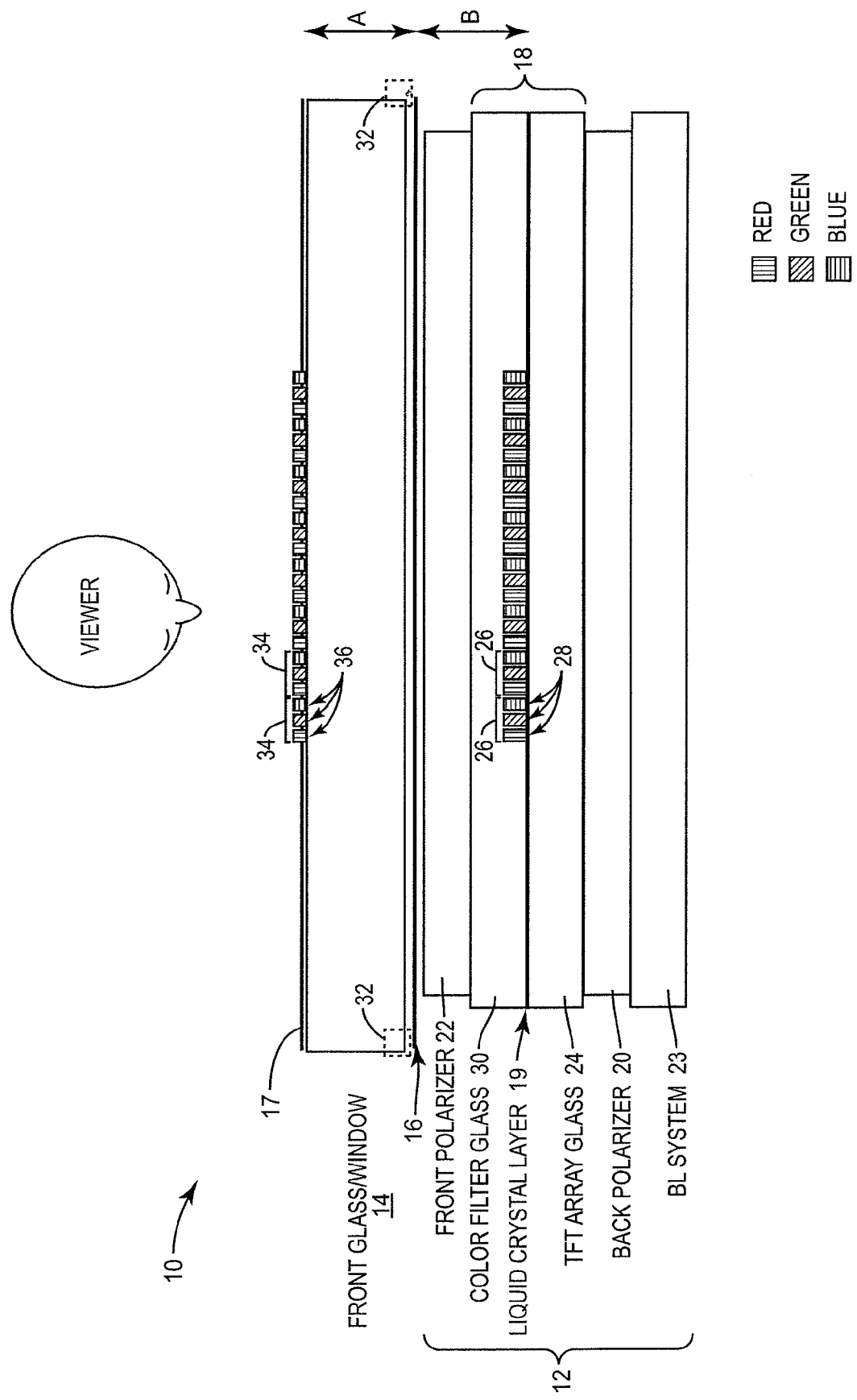
FIG. 1 illustrates a cross-section of an example electronic display projection assembly, which includes a projecting layer.

FIG. 1 illustrates a cross-section of an example electronic display projection assembly 10 that addresses the aforementioned problems of prior art electronic displays. The assembly 10 includes an electronic display 12, a transparent glass layer 14, a projecting layer 16, and a projection layer 17. In the example of FIG. 1, the electronic display 12 comprises a liquid crystal display (LCD). LCDs are well known in the art, so operation of the LCD electronic display 12 will only be described briefly below.

The LCD 12 includes a liquid crystal display module 18 disposed between a pair of polarizing layers, namely a back polarizer 20 and a front polarizer 22. The liquid crystal display module 18 includes a liquid crystal layer 19 sandwiched between a thin-film transistor (TFT) array glass layer 24 and a color filter glass layer 30. The liquid crystal layer 19 may include twisted nematic (TN) liquid crystals or super-twisted nematic (STN) liquid crystals, for example. The TFT array glass layer 24 is disposed between the liquid crystal layer 19 and the back polarizer 20, and includes a plurality of transistors located in close proximity to the liquid crystal layer 19. When the LCD 12 is OFF, the liquid crystals are oriented to block light from backlighting system 23 from passing through the polarizers 20, 22. In prior art devices, this causes LCDs to have a black appearance.

However, the transistors can be selectively actuated to apply a voltage to one or more of the liquid crystals, causing the crystals to rotate and permit light to pass through the polarizers 20, 22. An amount of voltage applied to a given liquid crystal controls the degree of rotation of that crystal, which in turn controls how much light passes through the polarizers 20, 22. Each of a plurality of pixels 26 (a subset of them are shown in an enlarged view in FIG. 1) includes three individual sub-pixels 28 (e.g. red, green and blue sub-pixels—indicated by crosshatching in FIG. 1). By selectively controlling transistors behind each sub-pixel 28, the sub-pixels 28 can be controlled to display colors via the color filter glass 30. As such, the TFT array glass layer 24 controls the color of each pixel 26 of the electronic display 12. The electronic display 12 operates the TFT array glass 24 to controls a plurality of the pixels 26 to display images on the front polarizer 22. Of course, although the electronic display 12 is illustrated as comprising an LCD, it is understood that an LCD is only one non-limiting example of an electronic display that could be used in the inventive projection assembly 10.

FIG. 1 illustrates a cross-section of an example electronic display projection assembly 10. The inventive assembly 10 of FIG. 1 utilizes the projecting layer 16 to project the individual pixels 26 of the electronic display 12 through the glass layer 14 onto the projection layer 17 to display pixels 34 (which in turn include corresponding sub-pixels 36). The transparent glass layer 14 is positioned on a side of the electronic display 12 on which the image is displayed (i.e., adjacent to an outermost surface of the front polarizer 22). The projecting layer 16 is positioned between the electronic display 12 and the glass layer 14. In FIG. 1 the projecting layer 16 and the projection layer 17 are located on opposite sides of the glass layer 14. The projecting layer 16 includes a plurality of microlenses for projecting the displayed image from the electronic display 12 through the glass layer 14 and onto the projection layer 17. The projecting layer 16 may be a plastic film including several plastic layers, such as those offered by Rolling Optics (http://www.rollingoptics.com/).

In one or more embodiments, the projection layer 17 may be translucent, in that the layer 17 transmits some light, but is not completely transparent. The projection layer 17 may be a film that is applied to the glass layer 14. The projection layer 17 may be treated to reflect substantially white light when the electronic display is in an OFF state, enabling the electronic display 12 to have a white, instead of a black, OFF state. Of course white is only an example color, and the projection layer 17 could be treated to reflect another color when the electronic display 12 is in the OFF state.

As discussed above, each pixel 26 includes a plurality of sub-pixels 28 (in the example of FIG. 1 there are three sub-pixels 28 per pixel 26). For each sub-pixel 28, there is at least one corresponding transistor in the TFT array glass 24 layer. The microlenses may be formed such that the area of each microlens is smaller than the area of each sub-pixel 28. Additionally, the area of each microlens may be smaller than a spacing area between adjacent pixels 26 (i.e. an area of the space between the pixels 26 of FIG. 1) or an area between adjacent sub-pixels 28. Utilizing microlenses that are sized as described above can help maintain image clarity by preventing blurring that may otherwise occur if individual microlenses overlapped adjacent pixels 26 or sub-pixels 28. Of course, although a large quantity of microlenses has been described as being implemented in the layer 16, in some embodiments, larger lenses or even a single large lens may be used in the layer 16 instead of the plurality of smaller microlenses.

In the embodiment of FIG. 1, the layers 16, 17 are located on opposite sides of the transparent glass layer 14. With the projection layer 17 being located on an exterior viewing surface of the assembly 10, a zero (or substantially zero) distance may be achieved from the surface of the glass 14 to the image on the projection layer 17 by projecting the displayed image closer to the viewing surface, which can mitigate the parallax effect described above. In this embodiment, it may be desirable to apply an anti-reflective coating to the exterior of the projection layer 17 to prevent undesirable reflections, and/or to include a hard coating or anti-fingerprint coating to prevent damage and fingerprints, respectively, from affecting the projection layer 17.

Figure 2:
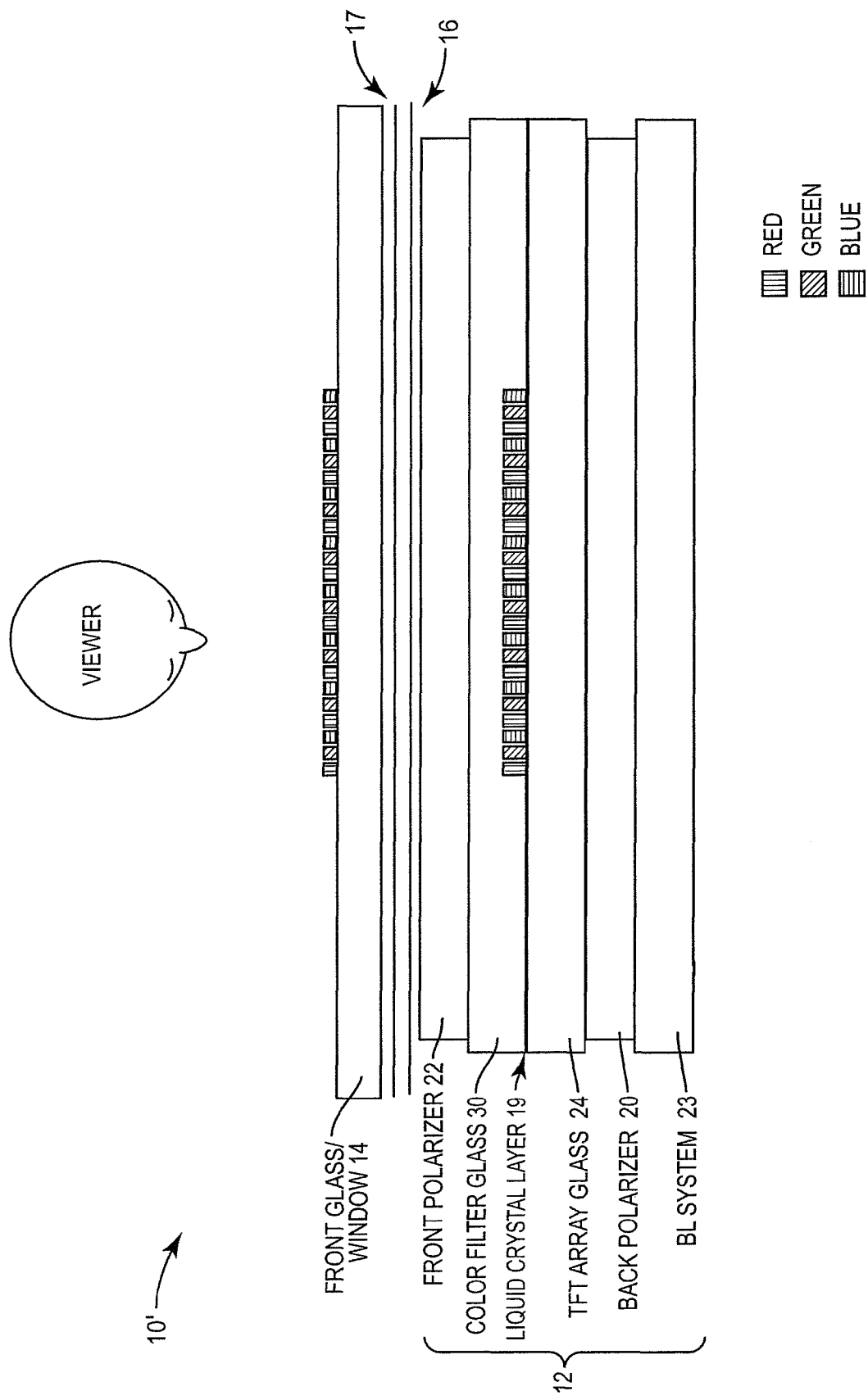
FIG. 2 illustrates a cross-section of an additional embodiment of the electronic display projection assembly.

FIG. 2 illustrates an alternate embodiment of the assembly (shown as 10') in which the projecting layer 16 and the projection layer 17 are located on the same side of the glass layer (i.e., between the glass layer 14 and the electronic display 12). In this embodiment, the projection layer 17 is in closer proximity to, and perhaps even in contact with, the projecting layer 16. In this embodiment, some of the coatings described above (e.g. the hard coating, anti-fingerprint coating, etc.) may be omitted, as the glass layer 14 shields the layer 17 from user contact.

Referring again to FIG. 1, in one example the thickness of the layers 14, 16, 17 (shown as "A") is on the order of 0.5 mm, and the thickness of the front polarizer 22 and color filter glass 30 (shown as "B") is collectively also on the order of 0.5 mm. By contrast, the thickness of the projection layer 16 is on the order of 250 micrometers (μm). Of course, these are only example values, and other thicknesses could be used.

Figure 1A:
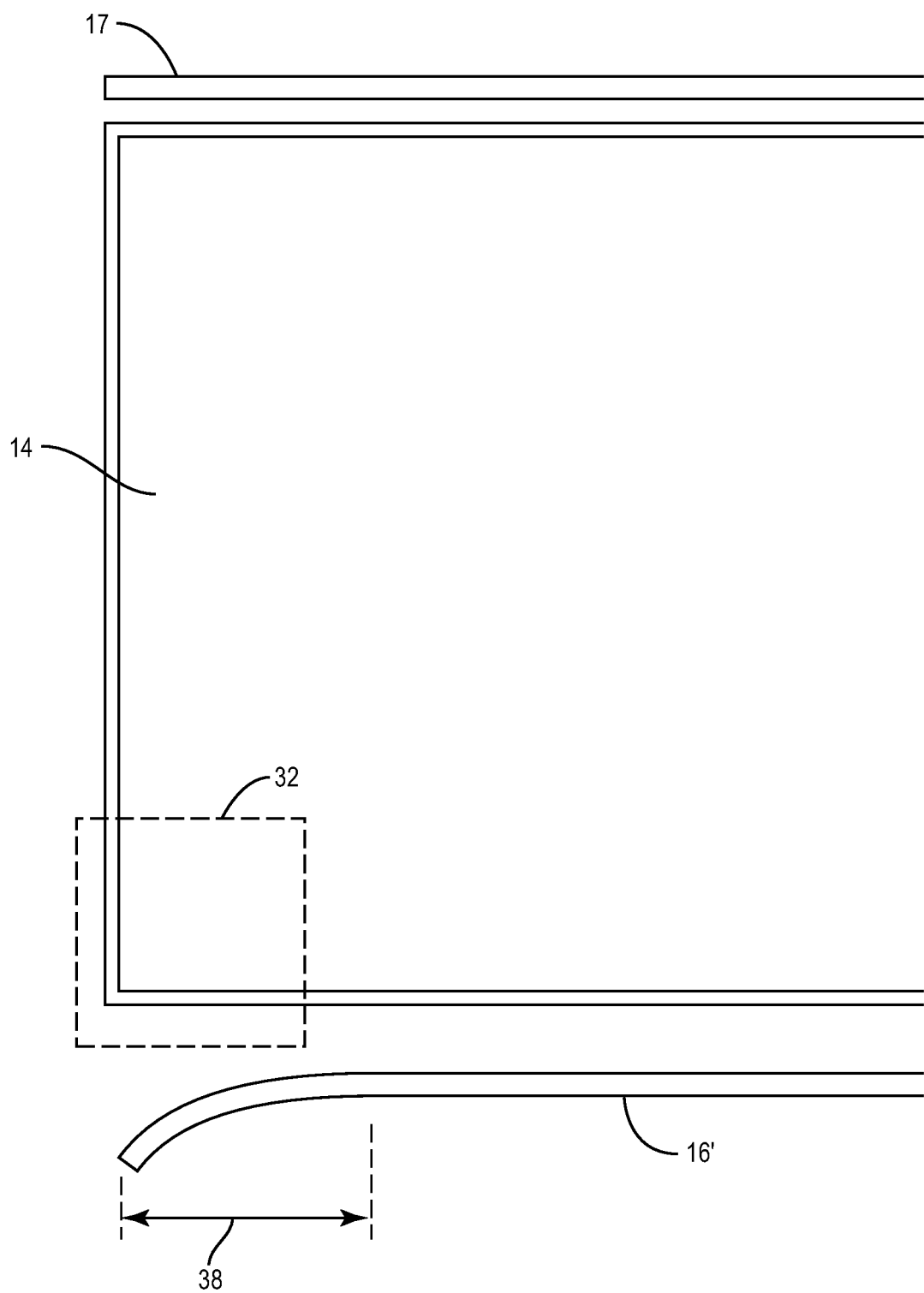
FIG. 1A illustrates a portion of the projecting layer of FIG. 1 according to one embodiment.

The projecting layer 16 may be adjusted to facilitate image projection onto the outer edge contours of the glass layer 14, such that active pixels can be displayed across the entire glass layer 14, removing the need for a display border. This may be achieved by altering the angle of the microlenses in the layer 16, such that the majority of the microlenses extend in a direction perpendicular to the surface 17, but the outermost microlenses along opposite sides and possibly all four sides of the glass layer 14 (see, e.g., region 32) extend at an outward angle towards the sides of the projection layer 17, to effectively bend the outer portion of the projected image. Although this may cause some minor image distortion at the outer portions of the layer 17, active pixels could advantageously fill the entire area of the glass window 14. In one example, the angled orientation of the microlenses is achieved by bending the layer 16 towards the backlight 23 and away from the layer 17 at those outermost edges (e.g., region 32). An example of this is shown in FIG. 1A, in which region 38 of projecting layer 16' is angled away from the projection layer 17.

Figure 3:
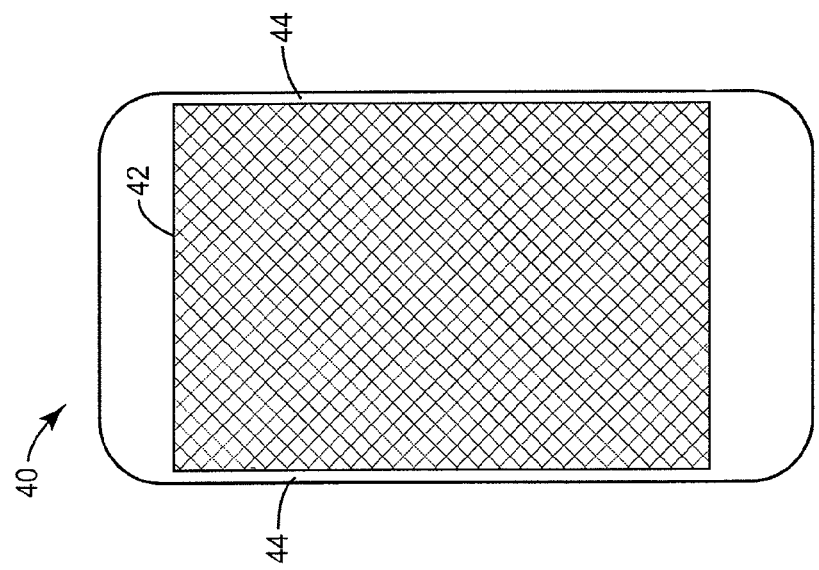
FIG. 3 illustrates a prior art smartphone including an electronic display.

FIG. 3 illustrates a prior art smartphone electronic device 40 that includes an electronic display (not shown) that projects onto a display area 42, with the display area 42 having a black appearance (shown as crosshatching) when the device is in an OFF state. Notably, the display area 42 does not extend all the way to the outer perimeter of the phone 42, but instead is surrounded by a border 44 on the narrow sides.

Figure 5:
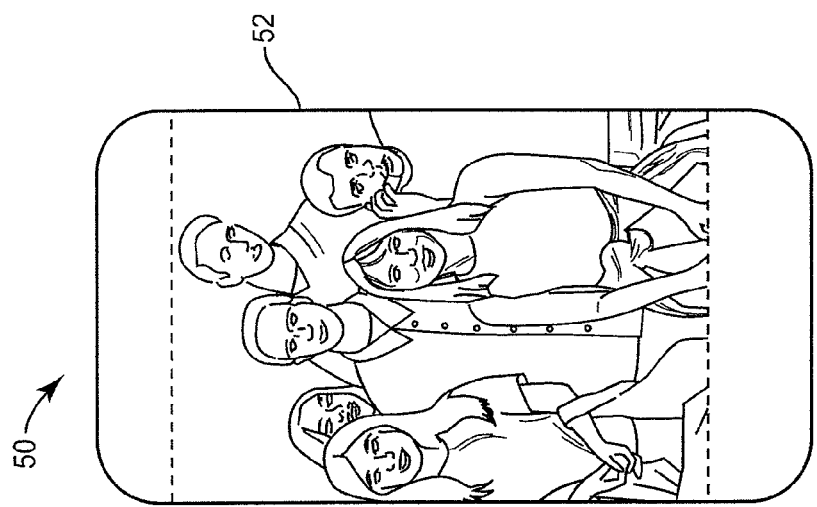
FIGS. 4-5 illustrate a smartphone implementing the electronic display projection assembly of FIG. 1 or FIG. 2.
Figure 4:
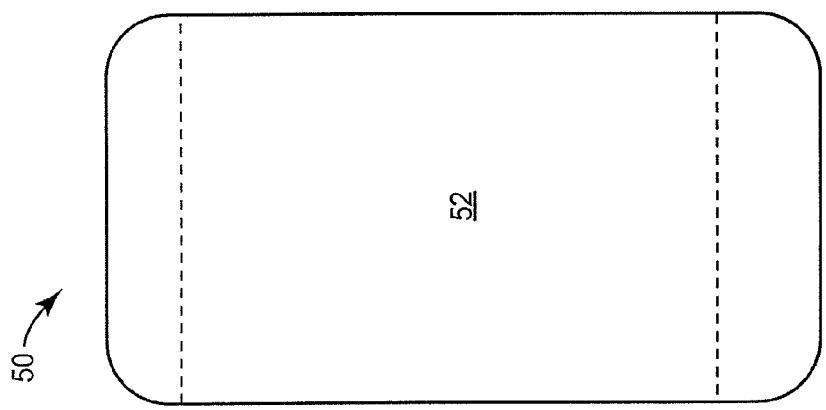

Contrast this with the smartphone electronic device 50 of FIGS. 4-5 which implements the electronic display projection assembly 10. As shown in FIG. 4, when the device 50 is in an OFF state, a display area 52 of the device 50 reflects substantially white light to have a white appearance (see FIG. 4). When the device 50 is in the ON state, an image is projected on to the layer 17 of the display area 50 (see FIG. 5).

By implementing the teachings discussed above, the device 10 is able to reduce the border 44 of the device 40 and to extend its image to the outermost sides of the device 50, facilitating omission of the border 44 for example. Also, the device 10 is able to exhibit a substantially white off state, and to display its image closer to its viewing surface to provide an improved immersive user impression.

Figure 6:
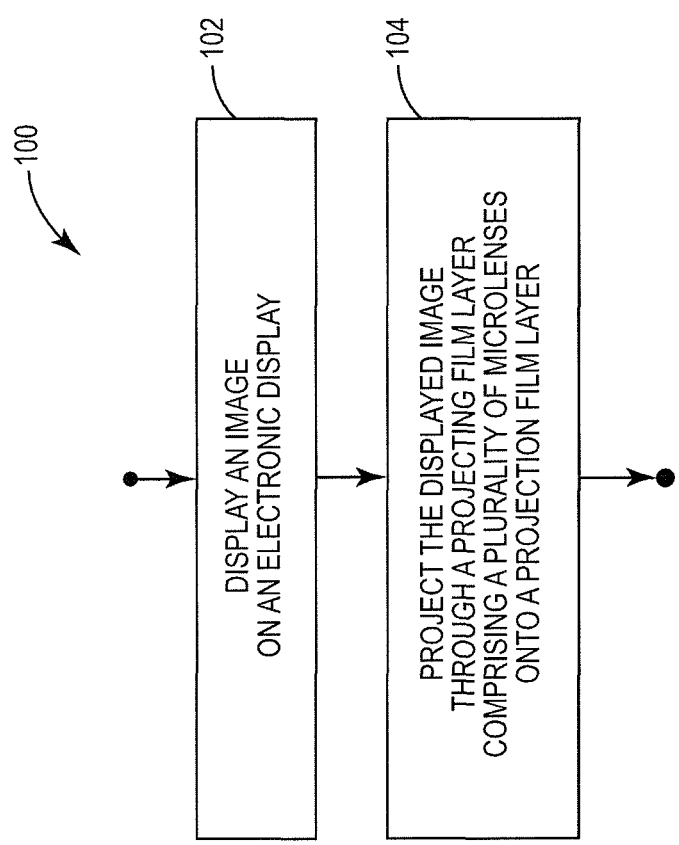
FIG. 6 illustrates a method of providing an image from an electronic display.

FIG. 6 schematically illustrates a corresponding method 100 of providing an image from the electronic display 12 of FIGS. 1-2 and is displayed on the electronic display 12 (step 102). The displayed image is projected through the projecting layer 16, which includes the plurality of microlenses, onto the projection layer 17 (step 104).

In one or more embodiments (see FIG. 1), the layers 16, 17 are located on opposite sides of the glass layer 14, such that in step 104 the displayed image is projected through the plurality of microlenses and through the transparent glass layer 14 onto the projection layer 17. Alternatively, in other embodiments (see FIG. 2), the layers 16, 17 are on the same side of the glass layer 14, such that the projection layer 17 is viewable through the glass layer 14.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. An electronic display projection assembly, comprising:
an electronic display configured to display an image;
a glass layer positioned on a side of the electronic display on which the image is displayed, wherein the glass layer is transparent;
a projection film layer on a surface of the glass layer; and
a projecting film layer positioned between the electronic display and the glass layer, and comprising a plurality of microlenses for projecting the displayed image either through the glass layer onto the projection film layer, or onto the projection film layer for viewing through the glass layer;
wherein the projection film layer is translucent, and reflects substantially white light when the electronic display is in an OFF state.

2. The electronic display projection assembly of claim 1, wherein the electronic display is a liquid crystal display (LCD).

3. The electronic display projection assembly of claim 1, wherein the transparent glass layer comprises a touch screen input device.

4. The electronic display projection assembly of claim 1, wherein the projecting film layer is configured to stretch the projected image to outer edges of the glass layer.

5. The electronic display projection assembly of claim 1, wherein the electronic display includes a collimated backlight.

6. The electronic display projection assembly of claim 1, wherein the electronic display has a plurality of pixels, each pixel including at least three sub-pixels, and wherein an area of each microlens is smaller than an area of each sub-pixel.

7. The electronic display projection assembly of claim 6, wherein the area of each microlens is also smaller than a spacing area between adjacent pixels or a spacing area between adjacent sub-pixels.

8. The electronic display projection assembly of claim 1, wherein the projecting film layer comprises a plurality of plastic layers arranged to form the microlenses.

9. A method of providing an image from an electronic display, comprising:
displaying an image from an electronic display onto a projecting film layer comprising a plurality of microlenses; and
projecting the displayed image through the plurality of microlenses and either through a glass layer onto a projection film layer on the glass layer, or onto the projection layer for viewing through the glass layer, wherein the glass layer is transparent;
wherein the projection film layer is translucent, and reflects substantially white light when the electronic display is in an OFF state.

10. The method of claim 9, wherein the electronic display is a liquid crystal display (LCD).

11. The method of claim 9, wherein the transparent glass layer comprises a touch screen input device.

12. The method of claim 9, wherein the projecting film layer is configured to stretch the projected image to outer edges of the glass layer.

13. The method of claim 9, wherein the electronic display includes a collimated backlight.

14. The method of claim 9, wherein the electronic display has a plurality of pixels, each pixel including at least three sub-pixels, and wherein an area of each microlens is smaller than an area of each sub-pixel.

15. The method of claim 14, wherein the area of each microlens is also smaller than a spacing area between adjacent pixels or a spacing area between adjacent sub-pixels.

16. The method of claim 9, wherein the projecting film layer comprises a plurality of plastic layers arranged to form the microlenses.

* * * * *